No. 771,031. PATENTED SEPT. 27, 1904.
H. A. ABENDROTH.
AMMONIA WATER APPARATUS.
APPLICATION FILED OCT. 3, 1903.
NO MODEL.

Witnesses
W. M. Avery
Geo. G. Hoster

Inventor
Herrmann Arthur Abendroth
by
Attorneys.

No. 771,031.                                  Patented September 27, 1904.

UNITED STATES PATENT OFFICE.

HERRMANN ARTHUR ABENDROTH, OF BERLIN, GERMANY.

AMMONIA-WATER APPARATUS.

SPECIFICATION forming part of Letters Patent No. 771,031, dated September 27, 1904.

Application filed October 3, 1903. Serial No. 175,570. (No model.)

*To all whom it may concern:*

Be it known that I, HERRMANN ARTHUR ABENDROTH, a subject of the German Emperor, and a resident of Berlin, Germany, have invented new and useful Improvements in Ammonia-Water Apparatus, of which the following is a full, clear, and exact description.

The invention relates to evaporation and condensation; and its object is to provide certain new and useful improvements in ammonia-water apparatus whereby the overflow-pipes for the water can be readily removed from the cells for cleaning and other purposes and without requiring interruption of the process or unduly reducing the strength of the walls of the cells.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1:
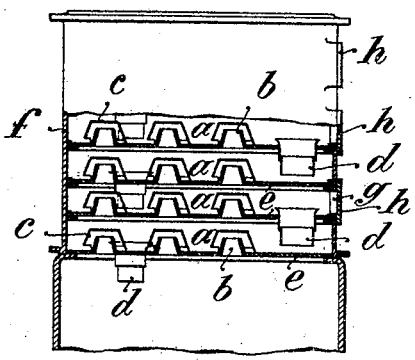
Figure 2:
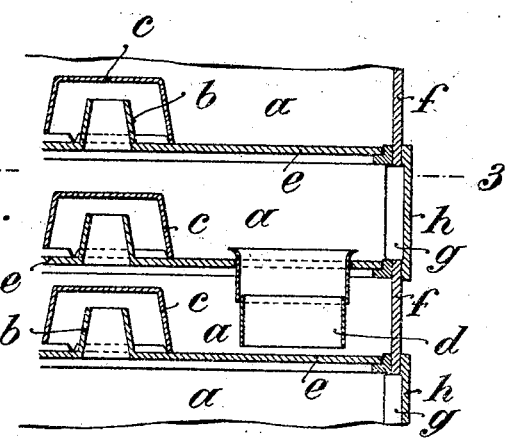
Figure 3:
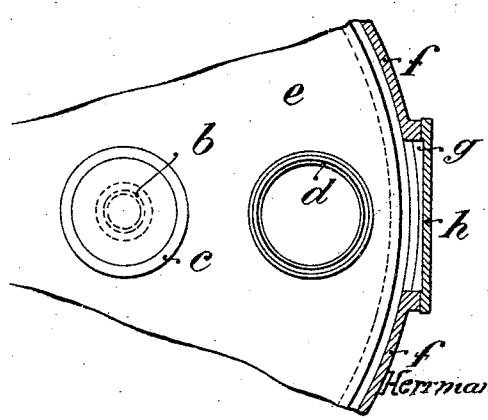

Figure 1 is a sectional elevation of the upper part of an ammonia-water apparatus provided with the improvement. Fig. 2 is an enlarged sectional elevation of the same, and Fig. 3 is a sectional plan view of the same on the line 3 3 of Fig. 2.

The invention relates to ammonia-water evaporating and condensing apparatus provided with a plurality of superimposed cells through which flows the ammonia-water in a downward direction to come in contact with steam passing in an upward direction through the cells, so that the free ammonia is evaporated, and the ammonia in solution is removed from the water by the use of lime in solution in the ammonia-water. In apparatus of this class use is made of overflow-pipes for conducting the ammonia-water from one cell to the next lower one, and as such overflow-pipes incrustate and require frequent cleaning it is desirable to remove the same from time to time. In order to do this without stopping the process and without unduly weakening the side walls of the cells, the following arrangement is provided:

The superimposed cells $a$ are provided in their bottoms $e$ with steam-inlets $b$, over which extend hoods $c$ in the usual manner. The overflow-pipes $d$ are loosely and removably held in the bottoms $e$ adjacent to openings $g$, formed in the side wall $f$ of the apparatus, the said openings $g$ being normally closed by removable covers $h$. In order to allow of making the openings $g$ as small as possible to prevent undue weakening of the side wall $f$, it is desirable to make the overflow-pipes $d$ in sections telescopically connected with each other, so that when the sections are folded up the overflow-pipe is not very high, and consequently can be readily removed through a small opening $g$.

From the foregoing it will be seen that an overflow-pipe can be readily and quickly removed at any time from its cell, it being only necessary to remove the cover $h$ to allow the operator to reach from the outside into the cell to close the sections of the overflow-pipe $d$ and then to remove the latter through the opening $g$ for the purpose above mentioned.

Having thus described my invention, I claim as new and desire to secure by Letters Patent—

1. An apparatus of the class described comprising superimposed cells, doors leading to the cells, and overflow-pipes removably supported in the bottoms of the said cells and each made in sections movable in relation one to the other.

2. An apparatus of the class described, provided with cells having covered openings in the side, and overflow-pipes removably supported in the bottoms of the cells, adjacent to the said openings, each overflow-pipe being made in sections telescoping one in the other, as set forth.

In testimony whereof I have signed my name to this specification in the presence of two subscribing witnesses.

HERRMANN ARTHUR ABENDROTH.

Witnesses:
  WOLDEMAR HAUPT,
  HENRY HASPER.